(12) United States Patent
Sellers

(10) Patent No.: US 6,741,456 B2
(45) Date of Patent: May 25, 2004

(54) SYSTEM AND METHOD FOR PIVOTABLY SECURING DISPLAY HOUSING TO COMPUTER SYSTEM

(75) Inventor: Charles A. Sellers, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 104 days.

(21) Appl. No.: 09/837,183

(22) Filed: Apr. 18, 2001

(65) Prior Publication Data

US 2002/0154473 A1 Oct. 24, 2002

(51) Int. Cl.⁷ ................................................ H05K 7/16
(52) U.S. Cl. .................... 361/681; 361/683; 16/338; 348/794
(58) Field of Search .............................. 361/680–683; 16/221–252, 337–342, 303, 31.9, 320, 321, 322; 348/794

(56) References Cited

U.S. PATENT DOCUMENTS

| | | | | |
|---|---|---|---|---|
| 4,781,422 A | * | 11/1988 | Kimble | 16/337 |
| 5,165,145 A | * | 11/1992 | Sherman | 16/303 |
| 5,251,102 A | * | 10/1993 | Kimble | 361/680 |
| 5,396,399 A | * | 3/1995 | Blair et al. | 16/445 |
| 5,436,792 A | * | 7/1995 | Leman et al. | 16/326 |
| 5,548,478 A | * | 8/1996 | Kumar et al. | 16/223 |
| 5,564,163 A | * | 10/1996 | Lowry et al. | 16/342 |
| 5,668,570 A | * | 9/1997 | Ditzik | 248/923 |
| 5,771,152 A | * | 6/1998 | Crompton et al. | 248/923 |
| 5,832,566 A | * | 11/1998 | Quek et al. | 16/342 |
| 6,101,676 A | * | 8/2000 | Wahl et al. | 16/340 |
| 6,256,193 B1 | * | 7/2001 | Janik et al. | 248/922 |
| 6,353,529 B1 | * | 3/2002 | Cies | 248/917 |
| 6,421,878 B1 | * | 7/2002 | Kaneko et al. | 16/330 |

* cited by examiner

*Primary Examiner*—Anatoly Vortman

(57) ABSTRACT

A computer having a base and a display. The display is pivotable relative to the base. The computer has a securing mechanism that pivotably secures the display to the base. The securing mechanism produces a force that opposes pivotal motion of the display. The securing mechanism also has a clutch operator that is operable to prevent the force from opposing the pivotal motion of the display.

15 Claims, 4 Drawing Sheets

SYSTEM AND METHOD FOR PIVOTABLY SECURING DISPLAY HOUSING TO COMPUTER SYSTEM

FIELD OF THE INVENTION

The present invention relates generally to computer systems. More specifically, the present invention relates to a system and method for pivotably securing a display to a base of a computer system.

BACKGROUND OF THE INVENTION

The typical notebook computer has a base that houses most of the electronics and a display enclosure that houses a display. The base is typically placed on a flat surface to operate the notebook computer. The base and display enclosure are hinged so that the display can be pivoted relative to the base to a desired viewing position. To stow the computer, the display is pivoted so that the display enclosure and base are folded against one another to protect the display during movement of the computer. One or more latches are used to hold the display and base in the stowed position. A two-step process typically is followed to place the computer in operation from the stowed position. First, the latches are operated to enable the display enclosure to be pivoted and, second, the display is pivoted to a desired position. Latch mechanisms, however, tend to be small features that protrude from the display enclosure. Consequently, they can be easily damaged due to handling.

Additionally, the display enclosure hinges often incorporate friction clutches that require significant force applied by the user to pivot the display enclosure. The friction holds the display enclosure in the desired angular position during operation. As the display panels have become increasingly larger, the amount of force required to maintain a display in a desired position has increased. Depending on the weight and size of the base, the user may need to hold the base down with one hand while pivoting the display enclosure with the other hand to ensure the base is not lifted from the surface on which it is resting.

Therefore, a need exists for a simpler technique for securing a pivotable display to a base. Specifically, a need exists for a technique that securely maintains a pivotable display in a desired angular position while also enabling the display to be pivoted easily when desired.

SUMMARY OF THE INVENTION

According to one aspect of the present invention, a computer having a base and a display is featured. The display is pivotable relative to the base over a range of motion. The computer has a securing mechanism that pivotably secures the display to the base. The securing mechanism utilizes a portion that produces an opposing force to pivotal motion of the display throughout a range of motion. The securing mechanism also has a device operable to prevent the assembly from opposing pivotal motion of the display housing.

According to another aspect of the present invention, an assembly for pivotably securing a computer display to a computer base unit is featured. The assembly has a hinge mechanism to enable the computer display to pivot relative to the computer base unit. The assembly also has an opposition member that produces a force to oppose pivotal motion of the display. Also, a clutch is operable to prevent the opposition member from opposing pivotal motion of the display.

According to another aspect of the present invention, a method of operating a computer system is featured. The computer system has a base unit, a pivotable display, and a device that produces a frictional force to oppose pivotable motion of the display. The method comprises operating a clutch assembly to reduce the frictional force opposing pivotable motion of the display. The method also comprises pivoting the display to a desired position.

BRIEF DESCRIPTION OF THE DRAWINGS

The invention will hereafter be described with reference to the accompanying drawings, wherein like reference numerals denote like elements, and.

DETAILED DESCRIPTION OF EXEMPLARY EMBODIMENTS

Figure 1:
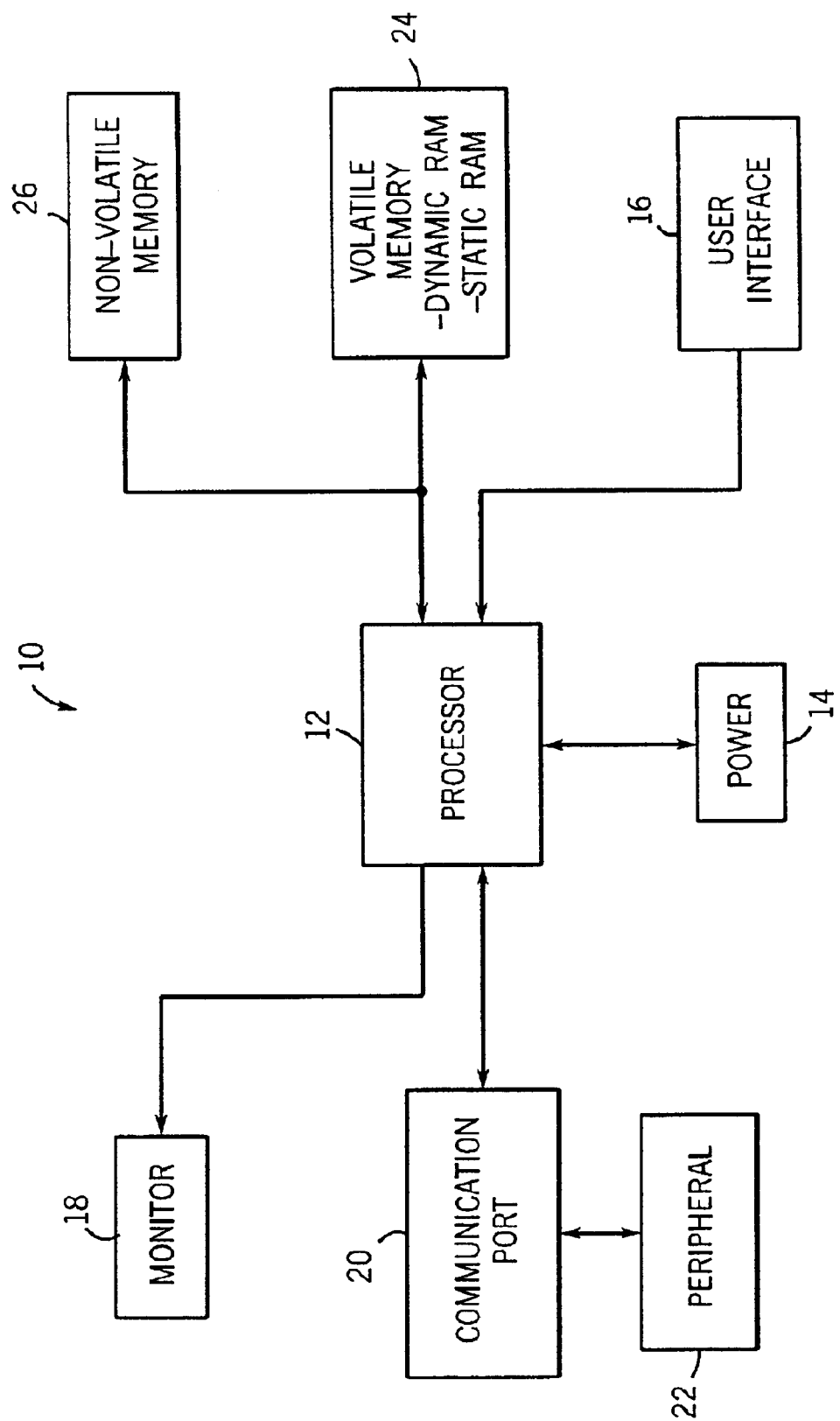
FIG. 1 is a block diagram of a computer system, according to an exemplary embodiment of the present invention.

Referring generally to FIG. 1, a block diagram is illustrated depicting an exemplary computer system, generally designated by the reference numeral 10. The computer system 10 may be any of a variety of different types, such as a notebook computer, a desktop computer, a workstation, etc.

Computer system 10 comprises a processor 12 to control the function of the computer. Computers also typically require a power supply 14. The power supply 14 of, for example, a notebook computer typically uses a rechargeable battery to enable the computer to be portable. Various additional devices are usually coupled to the processor 12, depending on the desired functions of the device 10. For instance, a user interface 16 may be coupled to the processor 12 to allow an operator to control some or all of the functions of the computer. Examples of user interfaces include a keyboard, a mouse, or a joystick. A monitor 18 is used to allow an operator to view visual information generated by the computer. A communications port 20 may be coupled to processor 12 to enable the computer 10 to communicate with peripheral devices 22, such as a modem, a printer, or another computer.

Software programming is typically used to control the operation of a processor and this software programming is typically stored in electronic memory. There are several different types of electronic memory available for use in computers. For example, the processor 12 may be coupled to volatile memory 24. Volatile memory may include dynamic random access memory (DRAM) and/or static random access memory (SRAM). The processor 12 also can be coupled to non-volatile memory 26. Non-volatile memory 26 may include a read only memory (ROM), such as an EPROM, to be used in conjunction with the volatile memory. Also, the non-volatile memory 26 may comprise a high capacity memory such as a disk or tape drive memory.

Figure 2:
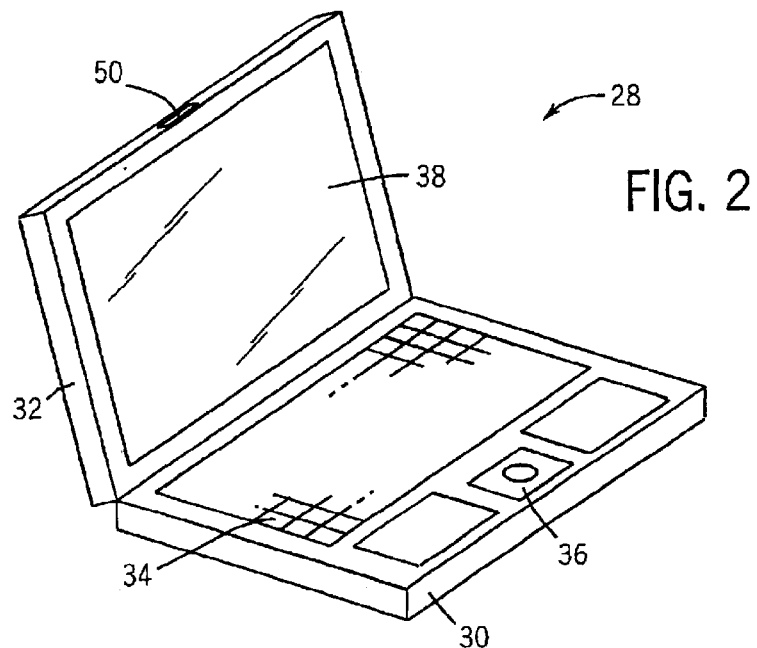
FIG. 2 is a front perspective view of a notebook computer, according to an exemplary embodiment of the present invention.

Referring generally to FIG. 2, an exemplary portable computer 28, e.g., a notebook computer, having a base 30 and a display enclosure 32 is illustrated. The base 30 houses a processor, memory, and other electronic components to enable the computer to operate. Additionally, the base houses a keyboard 34 and a mouse pad 36. The display enclosure 32 houses a display 38, such as a flat screen. Display 38 is pivotally secured to base 30 so that the display 38 may be pivoted to a desired angular position relative to base 30. This enables a user to position display 38 to the optimal position for viewing.

Figure 3:
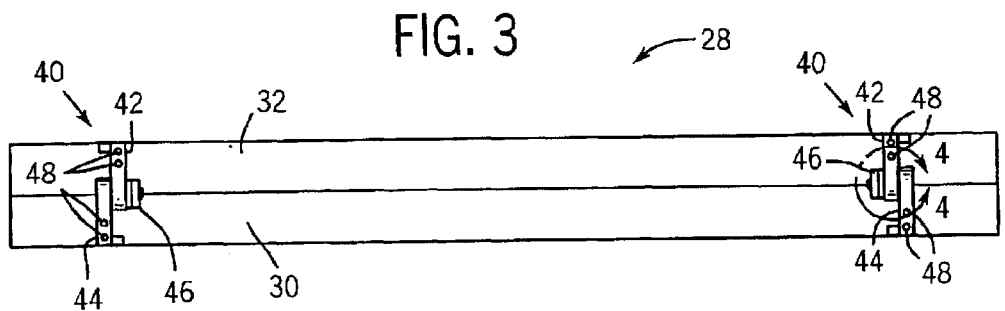
FIG. 3 is a rear view of the notebook computer of FIG. 2.

Referring generally to FIG. 3, the display enclosure 32 is secured to the base 30 by two hinge assemblies 40. Each hinge assembly 40 has a first member 42, a second member 44, and a clutch assembly 46. The first member 42 is secured to the display enclosure 32 and the second member 44 is secured to the base 30. In this embodiment, threaded fasteners 48 are used to secure the first and second members to the display enclosure 32 and base 30, respectively. However, other techniques for securing the first and second members to the disclosure 32 and base 30, respectively, may be utilized.

Each hinge assembly 40 is configured so the first member 42 is pivotally secured to the second member 44, enabling the display 38 to pivot relative to the base 30. The clutch assembly 46 controls the amount of friction that is produced between the first and second member during pivotal movement of the display 38. Friction between the first and second members is used to hold the display 38 at a desired angular position relative to the base 30.

Referring again to FIG. 2, the hinge assemblies 40 have a high-friction mode of operation and a low-friction mode of operation. In the high-friction mode, the friction between the first member 42 and the second member 44 maintains the display enclosure 32 securely positioned at any angular position relative to base 30. In the exemplary embodiment, the high-friction mode is the normal mode of operation of the hinge assemblies 40. The low-friction mode is initiated to facilitate repositioning of the display enclosure 32 relative to the base 30.

In the illustrated embodiment, the low-friction mode is initiated by actuating a clutch operator 50 located on the display enclosure 32. The clutch operator 50 may be a sliding switch, a push button, etc., that is coupled to the clutch assembly 46. When clutch operator 50 is actuated, the clutch assembly 46 reduces the friction between the first member 42 and the second member 44 enabling the display 38 to be repositioned more easily.

The two modes of operation provide an additional benefit in that the friction between base 30 and display enclosure 32 can be made greater than would normally be feasible. The higher friction enables the display enclosure 32 to be more securely maintained in a desired position. Normally, high friction between display enclosure 32 and base 30 makes it difficult for the display enclosure 32 to be repositioned, or at least be repositioned easily. However, because the hinge assembly can be placed in a low-friction mode during repositioning, higher friction between the base 30 and display enclosure 32 can be utilized.

Figure 4:
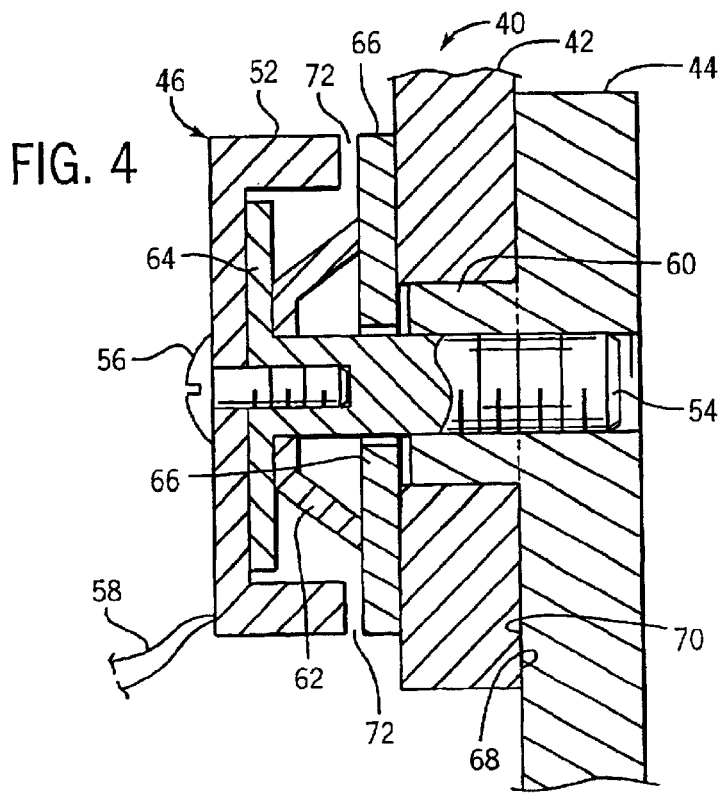
FIG. 4 is a cross-sectional view, taken generally along line 4—4 of FIG. 3, illustrating an electrically operated clutch for a hinge assembly operating in a high-friction mode.

Referring generally to FIG. 4, a cross-sectional view of one exemplary hinge assembly 40 is illustrated. In the illustrated embodiment, an electro-magnetic coil 52 is used to operate the clutch assembly 46. A first threaded fastener 54 and a second threaded fastener 56 secure the coil 52 to second member 44. Electricity is supplied to coil 52 by electrical wiring 58 extending from inside the base 30. The wiring may be routed to coil 52 in a variety of ways, such as through hinge assembly 40.

In the illustrated embodiment, a portion 60 of the second member forms an axle to enable the first member 42 to rotate about the second member 44. Additionally, in the illustrated embodiment, a beveled washer 62 is disposed between a flanged portion 64 of the first threaded fastener 54 and a generally flat washer 66 is disposed between the beveled washer 62 and the first member 42.

The hinge assembly 40 is configured so that the beveled washer 62 normally applies a force to drive the flat washer 66 against the first member 42 and, subsequently, to drive the first member 42 against the second member 44. The force of the first member 42 abutting against the second member produces friction between the inner surface 68 of the first member 42 and the outer surface 70 of the second member 44 during the high-friction mode of operation. The force of the beveled washer 62 also produces a gap 72 between the flat washer 66 and the coil 52 during the high-friction mode of operation.

Figure 5:
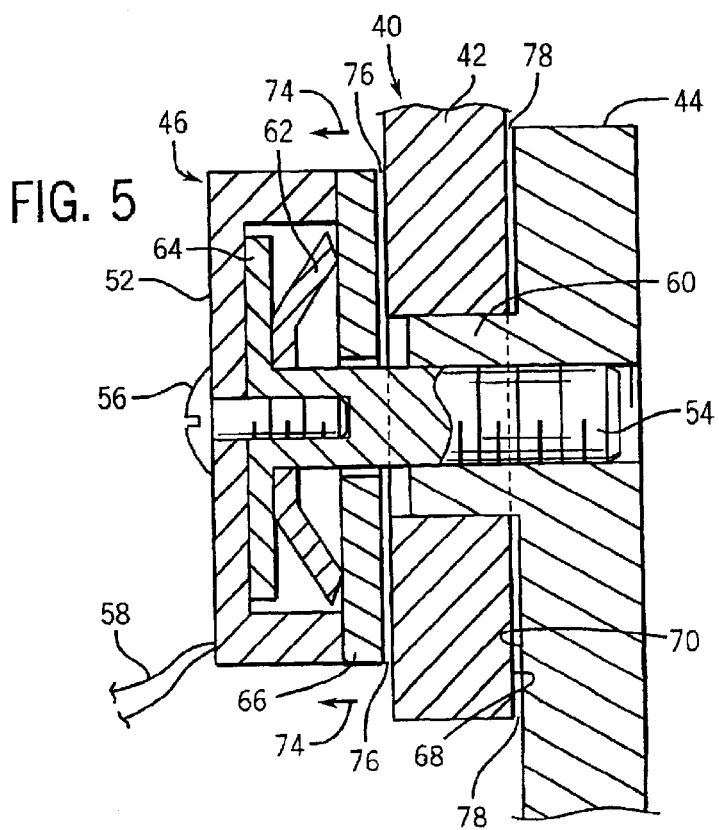
FIG. 5 is a cross-sectional view, taken along line 4—4 of FIG. 3, illustrating an electrically operated clutch for a hinge assembly operating in a low-friction mode.

In this embodiment, the flat washer 66 is comprised of a metallic material. When clutch operator 50 is activated, electric power is applied to coil 52. A magnetic field is produced by coil 52 that attracts the flat washer 66 towards coil 52 as illustrated in FIG. 5. The attractive force produced by the coil 52 is greater than the force produced by the beveled washer 62, driving the flat washer 66 towards coil 52, as represented by the arrows 74. The flat washer 66 closes the gap 72 between flat washer 66 and coil 52, compressing the beveled washer 62 and producing a gap 76 between the flat washer 66 and the first member 42. Consequently, the force driving first member 42 against second member 44 is removed.

When the movement of flat washer 66 produces a gap 78 between the first member 42 and the second member 44, there is no friction produced between the inner portion 68 of first member 42 and outer portion 70 of second member 44 during movement of display 38. However, even if the inner and outer portions remain in contact, the frictional force produced between the first and second members is reduced when the force of the beveled washer 62 acting on the first member 42 is removed, making pivotal movement of display 38 easier.

By way of example, the first member 42 and second member 44 are comprised of a light-weight plastic material. Alternatively, a portion of the first member 42 may be comprised of a metallic material so that the magnetic field generated by coil 52 pulls the first member 42 away from the second member 44 to produce gap 78 between the first and second members. Alternatively, the flat washer 66 may be secured to the first member 42 so that the first member 42 is moved with the flat washer 66.

Figure 6:
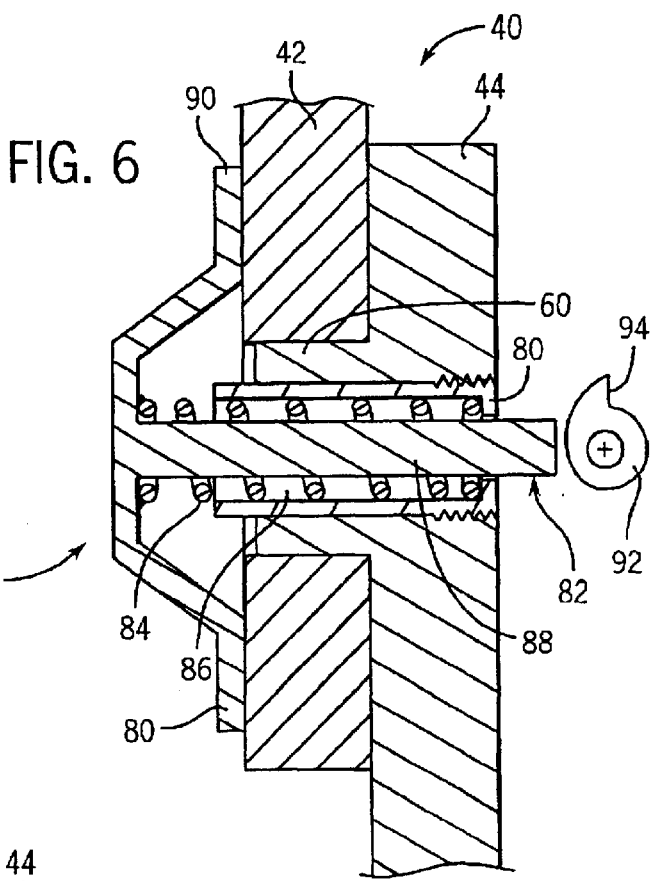
FIG. 6 is a cross-sectional view of a mechanically operated clutch for a hinge assembly operating in a high-friction mode.

Referring generally to FIG. 6, clutch assembly 46 also may be mechanically operated. In the illustrated embodiment, hinge assembly 40 has a threaded member 80, a movable member 82, and a spring 84. The threaded member 80 is affixed to the second member 44. Threaded member 80 also has a hollow interior 86 to house a cylindrical portion 88 of the movable member 82. The moveable member 82 also has a flanged portion 90.

Spring 84 is secured to fixed member 80 and movable member 82 and applies a force to pull flanged portion 90 against first member 42, forcing first member 42 against second member 44 and producing friction between first member 42 and second member 44. In the illustrated embodiment, the clutch operator 50 is mechanically coupled to a cam 92. When the clutch operator is activated, it causes the cam 92 to rotate. As the cam 92 is rotated, the cam 92 drives the movable member 82 linearly. In this view, cam 92 is illustrated in the high-friction mode. The cam is oriented in a first orientation 94 in the high-friction mode.

Figure 7:
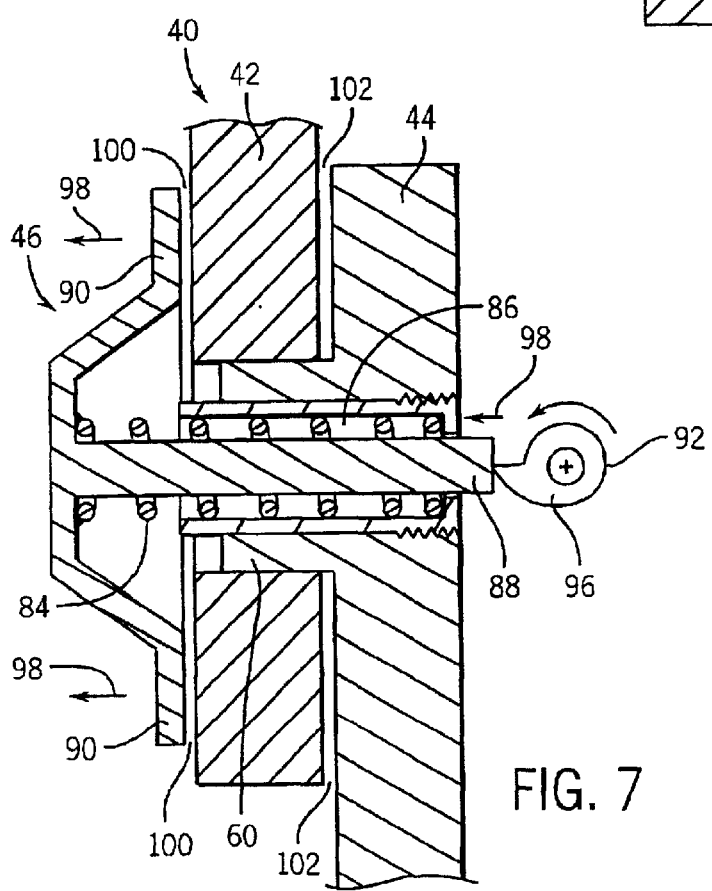
FIG. 7 is a cross-sectional view of a mechanically operated clutch for a hinge assembly operating in a low-friction mode.

Referring generally to FIG. 7, when operator 50 is actuated, cam 92 is rotated to a second orientation 96, driving the surface of cam 92 against the cylindrical portion 88 of movable member 82. The force applied by cam 92 drives movable member 82 linearly to the left in this view, as illustrated by the arrows 98, producing a gap 100 between the flanged portion 90 and first member 42 and reducing the friction between first member 42 and second member 44. A gap 102 may be produced between first member 42 and second member 44. However, regardless of whether a gap 102 is produced between first member 42 and second member 44, friction is reduced between first member 42 and second member 44.

It will be understood that the foregoing description is of preferred embodiments of this invention, and that the invention is not limited to the specific forms shown. For example, a spring may be utilized rather than a beveled washer in an electrically operated clutch. These and other modifications may be made in the design and arrangement of the elements without departing from the scope of the invention as expressed in the appended claims.

What is claimed is:

1. A computer system, comprising:
   a base;
   a display enclosure pivotably secured to the base;
   a positioning assembly that produces a force to prevent the display enclosure from pivoting relative to the base when disposed in a first position and reduces the force to enable the display enclosure to pivot relative to the base when disposed in a second position; and
   a switch coupled to the positioning assembly, the switch having a first state which causes the positioning assembly to be in the first position and a second state which causes the positioning assembly to be in the second position.

2. A computer system, comprising:
   a base;
   a display enclosure pivotably secured to the base;
   a positioning assembly that produces a force to prevent the display enclosure from pivoting relative to the base when disposed in a first position and reduces the force to enable the display enclosure to pivot relative to the base when disposed in a second position, wherein the force is generated by friction; and
   a switch coupled to the positioning assembly, the switch having a first state which causes the positioning assembly to be in the first position and a second state which causes the positioning assembly to be in the second position.

3. The system as recited in claim 1, wherein the positioning assembly comprises a first member secured to the display enclosure, a second member secured to the base, and a force producer to drive the first and second members into contact.

4. The system as recited in claim 3, wherein the switch prevents the force producer from driving the first and second members into contact when in the second state.

5. The system as recited in claim 1, wherein the switch comprises an operator to enable a user to change the state of the switch.

6. The system as recited in claim 5, wherein the operator is disposed on the display enclosure.

7. The system as recited in claim 1, wherein the switch is an electrical switch.

8. A computer system comprising:
   a base;
   a display enclosure pivotably secured to the base;
   a positioning assembly that produces a force to prevent the display enclosure from pivoting relative to the base when disposed in a first position and reduces the force to enable the display enclosure to pivot relative to the base when disposed in a second position; and
   a switch coupled to the positioning assembly, the switch having a first state which causes the positioning assembly to be in the first position and a second state which causes the positioning assembly to be in the second position, wherein the switch is a mechanical switch.

9. The system as recited in claim 1, wherein the base comprises a processor.

10. A clutch assembly for pivotably securing a computer display to a computer base, comprising:
    a hinge adapted to enable the computer display to pivot relative to the computer base unit; and
    a friction clutch coupled to the hinge, the friction clutch producing a force to oppose pivotal motion of the display; and
    a clutch operator selectively switchable to produce a counter-force to the force produced by the friction clutch to prevent the friction clutch from opposing pivotal motion of the display, wherein the clutch operator is electrically operated.

11. The clutch assembly as recited in claim 10, further comprising a manually operable switch operable to control electrical power to the clutch operator.

12. The clutch assembly as recited in claim 11, wherein the switch is biased so as to not supply electrical power to the third portion.

13. The clutch assembly as recited in claim 10, wherein the clutch operator is mechanically operated.

14. The clutch assembly as recited in claim 13, further comprising a movable member manually operable to mechanically operate the clutch operator.

15. The clutch assembly as recited in claim 14, wherein the movable member is biased so that the clutch operator does not prevent the friction clutch from opposing pivotal motion of the display.

* * * * *